United States Patent [19]

Gustavsson

[11] 3,707,830
[45] Jan. 2, 1973

[54] CYCLONE SEPARATOR

[75] Inventor: Karl-Axel G. Gustavsson, Enkoping, Sweden

[73] Assignee: Aktiebolaget Bahco Ventilation, Enkoping, Sweden

[22] Filed: May 18, 1971

[21] Appl. No.: 144,574

[52] U.S. Cl. .................. 55/410, 55/348, 55/418, 55/423, 55/457
[51] Int. Cl. ........................................... B01d 45/16
[58] Field of Search ........ 55/127, 347, 348, 393, 456, 55/457

[56] References Cited

UNITED STATES PATENTS

| 2,370,629 | 3/1945 | Appeldoorn | 55/457 X |
| 2,461,677 | 2/1949 | Burdock et al. | 55/348 |
| 2,667,944 | 2/1954 | Crites | 55/457 X |
| 3,360,909 | 1/1968 | Barnerias | 55/348 |
| 3,370,408 | 2/1968 | Lehrer et al. | 55/457 X |

Primary Examiner—Tim R. Miles
Assistant Examiner—Richard L. Chiesa
Attorney—Stevens, Davis, Miller & Mosher

[57] ABSTRACT

A cyclone separator having a cylindrical shell with a conical converging inlet portion. A ring of guide vanes is positioned within the outlet to impart a rotational flow to the entering gas and are axially moveable. At the opposite end of the shell a central tube extends through the end wall more than halfway into the shell, the tube having longitudinal slots tapered towards their free ends, the width being 20 to 40 percent of the diameter of the tube.

1 Claim, 2 Drawing Figures 3,707,830

CYCLONE SEPARATOR

The present invention relates to cyclone separators for separating dust from gases.

Cyclone separators are well-known and comprise in principle a substantially cylindrical shell having a gas inlet so arranged as to impart to the gas a rotary motion within the shell, a central outlet for the cleaned gas and an outlet for the dust separated in the shell by the centrifugal forces acting on the dust particles due to the rotation of the gas flow.

The separating ability of cyclone separators is substantially dependent on two factors; viz. the tangential component of the rotating flow of gas which imparts to the particles suspended in the gas a centrifugal acceleration out towards the periphery of the separator, and the radial velocity component of the gas flow in towards the center of the cyclone, which by means of friction strives to drive the particles, with the gas, out through the central outlet for the cleaned gas. A certain, theoretical particle size exists in equilibrium between these forces, this size being designated the limit size for the cyclone separator and constituting an essential factor with respect to its efficiency.

It is possible to increase this separation-promoting tangential component by some suitable means, such as, in the case of cyclones provided with an axial gas intake, by passing the gas between guide vanes at an angle sharply inclined relative to the separator axis, or by introducing the gas tangentially through one or more openings in the jacket of the cyclone, the cross sectional area of the openings being made small with respect to the flow of gas.

The tangential velocities which can be applied in practice, however, are limited because pressure losses and wear increase proportionally to the square of the tangential velocity. For the purpose of attaining maximum separation efficiency it is also important to maintain the tangential velocity at values permissible with regard to resistance and wear, when the separator is loaded with light flows of gas, e.g. caused by a drop in the gas flow from a thermal process.

When means have been provided to ensure that the tangential velocity can be maintained continuously at a maximum permitted level, any additional increase in efficiency of the apparatus must be attained by lowering the radial velocity component. This can be effected by enlarging the cyclone apparatus. However, if the diameter of the cyclone chamber is increased, the radius of rotation of the gas is also increased, against which the centrifugal force is inversely proportional, and consequently the thus reduced radial frictional forces acting on the particles are substantially nullified by the reduced centrifugal force. If, on the other hand, the cyclone is extended axially, retaining its diameter, the radial forces can be reduced whilst retaining the level of the centrifugal forces. However, in conventional cyclones provided with a central tube it has been shown unrewarding in practice to increase the length of the cyclone beyond a certain limit. This is due to the fact that the radial inflow of gas does not become uniformly distributed along the longitudinal axis of the cyclone but, in accordance with the law of following the path of least resistance, flows into a concentrated stream at the mouth of the central tube.

One object of the present invention is to provide a cyclone separator with a central tube which is so designed that the radial flow of gas in the same becomes evenly distributed along its length, even in the case of very tall, or long, cyclones. This design eliminates the risk of a concentrated stream forming at the mouth of the tube and consequently enables the efficiency of the cyclone to be raised by extending the length of said cyclone past the limit hitherto considered optimal and thus reduce the radial velocity component.

Another object of the invention is to provide a cyclone separator as aforesaid having means to control the rotation of the gas flow by means of members provided in the axial inlet of the cyclone separator to enable a greater or smaller portion of the gas flow to pass axially into the cyclone or to have imparted to it a rotational movement.

Other objects and advantages of the invention will appear as the description proceeds.

Briefly, a cyclone separator according to this invention comprises a substantially cylindrical shell having a conically converging inlet portion. A ring of guide vanes adapted to impart rotation to a gas flow entering axially into the said cylindrical shell, said guide vanes having a conical outer contour complementary to the conical inner wall of said conically converging inlet portion, is disposed within said conically converging inlet portion and is carried by control means whereby it may be displaced axially so that the rotation of the gas flow may be increased or reduced by causing a greater or less portion of the gas flow to follow the inclination of the guide vanes or pass axially into the cyclone through the clearance between the guide vanes and the conical cyclone inlet. At the end of the cylindrical shell opposite to that of the conical inlet, the cyclone comprises a bottom wall having one or more apertures adjacent its periphery for the discharge of separated dust. A central tube projects through said bottom wall for the outflow of purified gas and extends into the cyclone shell for more than half the length thereof. The central tube has a number of slots which widen progressively from the bottom wall of the cyclone to the end of the central tube facing the guide vane ring so that their total width at said end is at least 20 percent and not above 40 percent of the diameter of the central tube.

The invention will be explained more in detail with reference to the accompanying drawing which illustrates a preferred embodiment thereof.

Figure 1:
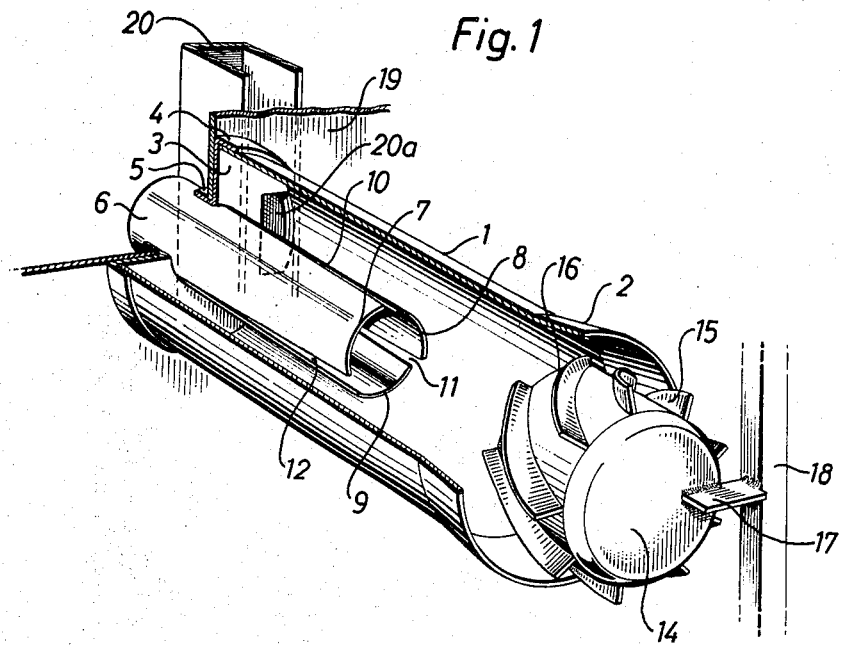
FIG. 1 shows a single cyclone separator embodying the present invention, in perspective view and partly in section.

The cyclone separator shown in FIG. 1 comprises a substantially cylindrical elongate shell 1 which at one end is formed with a conically outwardly flaring inlet portion 2. The opposite end of the cylindrical shell 1 is closed by an end wall 3 having an annular axial flange 4 by means of which it is secured, as by welding to the respective end portion of the cylindrical shell 1. The end wall 3 has a central opening surrounded by an outwardly directed annual flange 5 and a central tube 6 extends through said opening into the interior of the cylindrical shell in coaxial relation therewith and for a distance which is at least half the axial length of the cylindrical shell 1 as measured from the end-wall 1 to the level where the flaring inlet portion 2 deviates from the cylindrical shell 1.

The central tube 6 is affixed, e.g. by welding, to the flange 5 and its outer end projects a short distance from the end-wall 3 as shown, to form a gas outlet. The portion of the central tube 6 which is situated within the shell 1 is not properly cylindrical, but is formed by joining three blades 7, 8, 9 each being a 120° section of a cylinder in such a way that the axis of each section is slightly inclined away from the axis of the cylindrical shell whereby three slots 10, 11, 12 are formed which widen progressively from the plane of the end-wall 3 to the open front end of the central tube 6. The total width of said slots 10, 11, 12 at the open front end should be at least 20 percent and not above 40 percent of the diameter of the central tube 6.

A mainly cylindrical body 14 is axially displaceably disposed in the flaring inlet portion 2 and carries a number of helical guide vanes 15 on its periphery. The outer free edge 16 of each guide vane has a contour corresponding to the inclination of the inlet portion 2, so that when the body 14 is fully inserted into the inlet portion, said free edges 16 contact the inner wall of the inlet portion 2 along the length thereof. The body 14 is secured, as by welding, to an arm 17 which is similarly secured to a rod 18 and is adapted to be displaced axially through said arm 17 and said rod 18 by means which will be described.

In FIG. 1, the cyclone separator is shown secured by means of the end wall 3 to a wall 19 through which the central tube 6 extends and to which a dust collecting chute 20 is affixed. An aperture 20a is formed in the end wall 3 and registers with a similar aperture in wall 19 opening into the dust-collecting chute.

Figure 2:
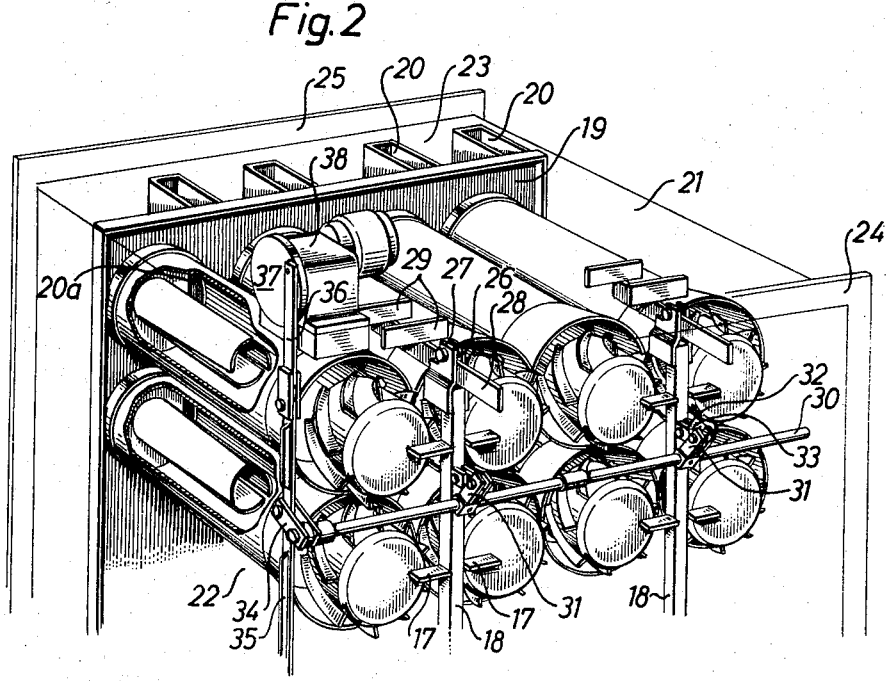
FIG. 2 shows an assembly of cyclone separators according to FIG. 1, the outer casing of the assembly being removed, in perspective view and partly in section.

As seen in FIG. 2, a plurality of cyclone separators are carried in parallel relationship by the wall 19 which has a number of dust-collecting chutes 20, one for each vertical column of cyclones. The wall 19 with the cyclones is placed in a casing 21 (indicated only by thin lines), so that the wall 19 divides the casing into an entrance chamber 22 for the dust-laden gas and an exit chamber 23 for the purified gas, each cyclone communicating with the entrance chamber 22 through the clearance between the conical inlet portion 2 and the body 14 and with the exit chamber 23 through its central tube 6 and each cyclone communicating with a chute 20 through its corresponding aperture 20a. The casing 21 is open at its front and rear side and has flanges 24, 25 to enable it to be connected to a duct for the supply of dust-laden gas as well as to a duct for removing the purified gas. The chutes 20 are closed at their tops by the top wall of the casing and extend downwardly through the bottom wall (not visible in FIG. 2) to discharge the dust into a suitable collecting device.

The guide vane carrying bodies 14 of the cyclone separators in two adjacent vertical columns of separators are all connected by arms 17 to a common vertical rod 18. Since there are four vertical columns there are two such rods 18. Each rod has at its top end a fork 26 supporting a roller 27 which rests upon a rail 28 which is affixed in a suitable manner below the top wall of the casing 21 and spaced therefrom e.g. by being welded to two bars 29 which are welded to the inside of the top wall.

A shaft 30 is suitably journalled by means not shown in the casing 21 and carries two arms 31 one adjacent each of the rods 18. Each arm 31 is connected to an arm 32 by means of a link 33 which is pivotally connected to both arms 31 and 32. The shaft 30 also has, at one end thereof, an arm 34 which is pivotally connected to a vertical rod 35 which at its top end is pivotally connected to a link 36 which in its turn is pivotally connected to a wheel 37 attached to the shaft of a motor 38 arranged on the top wall of the casing.

It will be understood that by means of this mechanism the motor 38 can serve to impart to the rods 18 a horizontal movement, whereby to displace all the guide vane carrying bodies 14 simultaneously axially within the flaring inlet portions 2 of the cyclones. The rods 18 are suitably guided also at their lower ends by means similar to the rails 28, and the mechanism is suitably provided with a counterweight or the like to bias it towards one end position, e.g. that shown in FIG. 2, in which case the motor will serve to move the guide vane carrying bodies towards the other end position against the action of the biasing means.

The gas to be purified from dust flows into the entrance chamber of the casing 21 and then in parallel into the cyclones, each of which the gas enters through the clearance between the inlet portion 2 and the body 14. Depending on the position of the guide vane body 11 a varying portion of the gas flow will move axially into the shell 1 of each cyclone along the inlet portion, while the remainder will have a rotary motion imparted to it by the guide vanes 15. The rotating gas flow enters the central tube 6 predominantly in a radial direction along its entire length through the slots 10, 11, 12 and flows out of the cyclone. The dust particles which have been separated by the centrifugal action, leave each cyclone through the aperture 20a.

The central tube 10 may be designed in various ways. Thus, instead of the structure shown, it is possible to use a cylindrical tube which has been provided with a number of slits formed by cutting out wedge-shaped pieces widening progressively from one end of the tube toward the other. It is also possible to make linear cuts along a tube and bend one of each cut away from the other, either inwardly or outwardly to form the slots.

In the embodiment shown the slots are such that the direction of flow through them is opposite to the direction of the rotation imparted to the gas by the guide vanes 15, i.e. the gas flow must make a turn of approximately 180° to enter each slot. This improves the efficiency of the apparatus, but is not a necessity. The slots may face in the other direction, or they may be such that the direction of flow through them is radial.

In any case, it should be observed that the slots should have a total width at the inner end of the central tube 6 which is between 20 and 40 percent of the diameter of the central tube. Outside of these limits, the separating efficiency of the cyclone is much reduced.

I claim:

1. A dust separator of cyclone type, comprising a substantially cylindrical shell having at one end thereof a conically converging inlet portion, a ring of guide vanes adapted to impart rotation to a flow of gas entering through said inlet portion disposed axially displaceable within said inlet portion, the guide vanes having an outer conical contour complementary to the conical shape of said inlet portion, control means for displacing said guide vane ring axially within said inlet portion to various positions adjacent said inlet portion to vary the rotational movement imparted to the entering gas flow, an end wall closing the end of said cylindrical shell opposite to the end carrying said inlet portion, said end-wall having adjacent its periphery one or more apertures for discharge of dust, a central tube for the outflow of purified gas extending through said end-wall and coaxially along the axis of said cylindrical shell for a distance not less than half the axial length of said cylindrical shell, said central tube having in its periphery at least one substantially longitudinal slot which widens progressively from said end-wall to the free end of said central tube facing the guide vane ring, the totAL width of the slots at said free end of the central tube being at least 20 percent and not above 40 percent of the diameter of the central tube.

* * * * *